(12) United States Patent
Bouda et al.

(10) Patent No.: US 10,741,149 B2
(45) Date of Patent: Aug. 11, 2020

(54) ASSISTED VISUAL SEPARATION ENHANCED BY GRAPHICAL VISUALIZATION

(71) Applicant: HONEYWELL INTERNATIONAL INC., Morris Plains, NJ (US)

(72) Inventors: Tomas Bouda, Brno (CZ); Zdenek Eichler, Olomouc (CZ); Pavel Klang, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 101 days.

(21) Appl. No.: 15/987,596

(22) Filed: May 23, 2018

(65) Prior Publication Data

US 2019/0362690 A1   Nov. 28, 2019

(51) Int. Cl.
| | |
|---|---|
| *G06F 3/048* | (2013.01) |
| *G09G 5/37* | (2006.01) |
| *B64D 43/00* | (2006.01) |
| *G06T 11/60* | (2006.01) |
| *G08G 5/00* | (2006.01) |

(52) U.S. Cl.
CPC .............. *G09G 5/37* (2013.01); *B64D 43/00* (2013.01); *G06T 11/60* (2013.01); *G08G 5/0004* (2013.01); *G06T 2200/24* (2013.01); *G09G 2354/00* (2013.01); *G09G 2370/022* (2013.01); *G09G 2380/12* (2013.01)

(58) Field of Classification Search
CPC .. G08G 5/0021; G08G 5/0078; G08G 5/0008; G08G 5/0013; G08G 5/045; G08G 5/0052; G08G 5/0086; G08G 5/025; G08G 5/0082; G08G 5/0091; G08G 5/0026; G08G 1/22; G08G 5/0004; G08G 5/0039; G08G 5/0065; G08G 5/06; G08G 1/161; G08G 5/0043; G08G 5/0069; G08G 5/02

See application file for complete search history.

(56) References Cited

U.S. PATENT DOCUMENTS

| | | |
|---|---|---|
| 6,085,150 A | 7/2000 | Henry et al. |
| 6,154,151 A | 11/2000 | McElreath et al. |
| 6,473,003 B2 | 10/2002 | Horvath et al. |
| 6,633,810 B1 | 10/2003 | Qureshi et al. |
| 6,696,980 B1 | 2/2004 | Langner et al. |
| 6,876,906 B1 | 4/2005 | Zellers et al. |
| 6,892,118 B1 | 5/2005 | Feyereisen |

(Continued)

*Primary Examiner* — Di Xiao
(74) *Attorney, Agent, or Firm* — Lorenz & Kopf, LLP

(57) ABSTRACT

Methods and apparatus are disclosed for providing visual assistance to a flight crew on an aircraft during flight. The method comprises generating a graphical user interface (GUI) element that displays a target aircraft symbol that represents a target aircraft and a horizontal range symbol that represents a pre-selected horizontal distance ahead of an ownship aircraft. The method further comprises positioning the target aircraft symbol at a variable position on the GUI element away from the horizontal range symbol, wherein the distance between the target aircraft symbol and the horizontal range symbol is proportional to an actual horizontal distance between the target aircraft position and the pre-selected horizontal distance ahead of the ownship aircraft; and causing the GUI element and the symbols to be displayed on a cockpit display.

20 Claims, 5 Drawing Sheets

(56) References Cited

U.S. PATENT DOCUMENTS

| | | | |
|---|---|---|---|
| 7,477,985 B2 | 1/2009 | Shirley et al. | |
| 7,570,178 B1 | 8/2009 | Whalen et al. | |
| 7,737,867 B2 | 6/2010 | Arthur et al. | |
| 7,848,877 B2 | 12/2010 | Goodman et al. | |
| 8,160,755 B2* | 4/2012 | Nichols | G06T 11/206 340/435 |
| 8,566,012 B1 | 10/2013 | Shafaat et al. | |
| 8,604,942 B2 | 12/2013 | Whitlow et al. | |
| 8,781,649 B2 | 7/2014 | Kar et al. | |
| 9,147,349 B2 | 9/2015 | Maddanimath et al. | |
| 9,377,325 B2 | 6/2016 | Behara et al. | |
| 9,501,936 B2 | 11/2016 | Trefilova et al. | |
| 9,646,503 B2 | 5/2017 | Kawalkar et al. | |
| 2013/0113635 A1* | 5/2013 | Whitlow | G01C 23/00 340/945 |
| 2015/0120177 A1* | 4/2015 | Palanisamy | G08G 5/0021 701/120 |
| 2016/0063866 A1 | 11/2016 | Trefilova et al. | |
| 2017/0103660 A1* | 4/2017 | Shafaat | G08G 5/0008 |

\* cited by examiner

ASSISTED VISUAL SEPARATION ENHANCED BY GRAPHICAL VISUALIZATION

STATEMENT REGARDING FEDERALLY SPONSORED RESEARCH OR DEVELOPMENT

This invention was made with Government support under 731864 awarded by SESAR Joint Undertaking/SESAR 2020. The Government has certain rights in the invention.

TECHNICAL FIELD

The technology described in this patent document relates generally to assisted visual separation procedures in aircraft flight and more particularly to graphical visualizations to assist in maintaining visual separation from traffic to follow.

BACKGROUND

CDTI (Cockpit Display of Traffic Information) Assisted Visual Separation (CAVS) is an ADS-B In (Automatic dependent surveillance—broadcast) application. An advantage of the CAVS application is that it may allow the flight crew to maintain ownship separation from preceding traffic when visual contact is lost (e.g., due to hazy or night conditions) using the information provided by the CDTI as a substitute for an out-the-window view. An example CAVS maneuver may operate as follows. Air traffic control (ATC) may provide clearance instructions that include the identification of a target aircraft to follow to the flight crew of an ownship aircraft. The flight crew of the ownship aircraft may report "Traffic in sight", designate the target aircraft to follow in its aircraft equipment, and set an alerting distance threshold (e.g., a pre-selected horizontal distance). As an example, the pre-selected horizontal distance may be two nautical miles (2 nm). The flight crew may adjust the ownship aircraft speed or maneuver laterally based on out the window (OTW) information to maintain ownship separation. The flight crew may adjust the ownship aircraft speed or maneuver laterally based on information provided by CDTI to maintain ownship separation when visual contact is lost. The CAVS maneuver may terminate when the target aircraft to follow lands. Use of CAVS may increase the flight crew's situational awareness particularly during a busy approach phase of flight, decrease ATC workload and increase airport capacity. Use of CAVS, however, may cause the flight crew to interpret alphanumerical information instead of OTW information when visual contact is lost. Interpreting alphanumerical information is generally slower and more cognitively demanding than interpreting graphical information.

Accordingly, it is desirable to provide an improved system for increasing the flight crew's situational awareness when using information displayed in the cockpit to maintain ownship separation when visual contact is lost. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of providing visual assistance to a flight crew on an aircraft during flight is provided. In one embodiment, the method includes generating a graphical user interface (GUI) element that displays a target aircraft symbol that represents a target aircraft and a horizontal range symbol that represents a pre-selected horizontal distance ahead of an ownship aircraft; positioning the target aircraft symbol at a variable position on the GUI element away from the horizontal range symbol using a fixed scaling factor, wherein the distance between the target aircraft symbol and the horizontal range symbol is proportional to an actual horizontal distance between the target aircraft position and the pre-selected horizontal distance ahead of the ownship aircraft; and causing the GUI element and the symbols to be displayed on a cockpit display.

A graphical visualization system for providing visual assistance to a flight crew on an aircraft during flight is provided. In one embodiment, the system includes a widget generation module. The widget generation module includes one or more processors configured by programming instructions on non-transient computer readable media. The widget generation module is configured to: generate a graphical user interface (GUI) element that displays a target aircraft symbol that represents a target aircraft and a horizontal range symbol that represents a pre-selected horizontal distance ahead of an ownship aircraft; position the target aircraft symbol at a variable position on the GUI element away from the horizontal range symbol using a fixed scaling factor, wherein the distance between the target aircraft symbol and the horizontal range symbol is proportional to an actual horizontal distance between the target aircraft position and the pre-selected horizontal distance ahead of the ownship aircraft; and cause the GUI element and the symbols to be displayed on a cockpit display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques and articles for increasing the situational awareness of the flight crew when using information displayed in the cockpit such as CDTI to maintain ownship separation when visual contact is lost. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
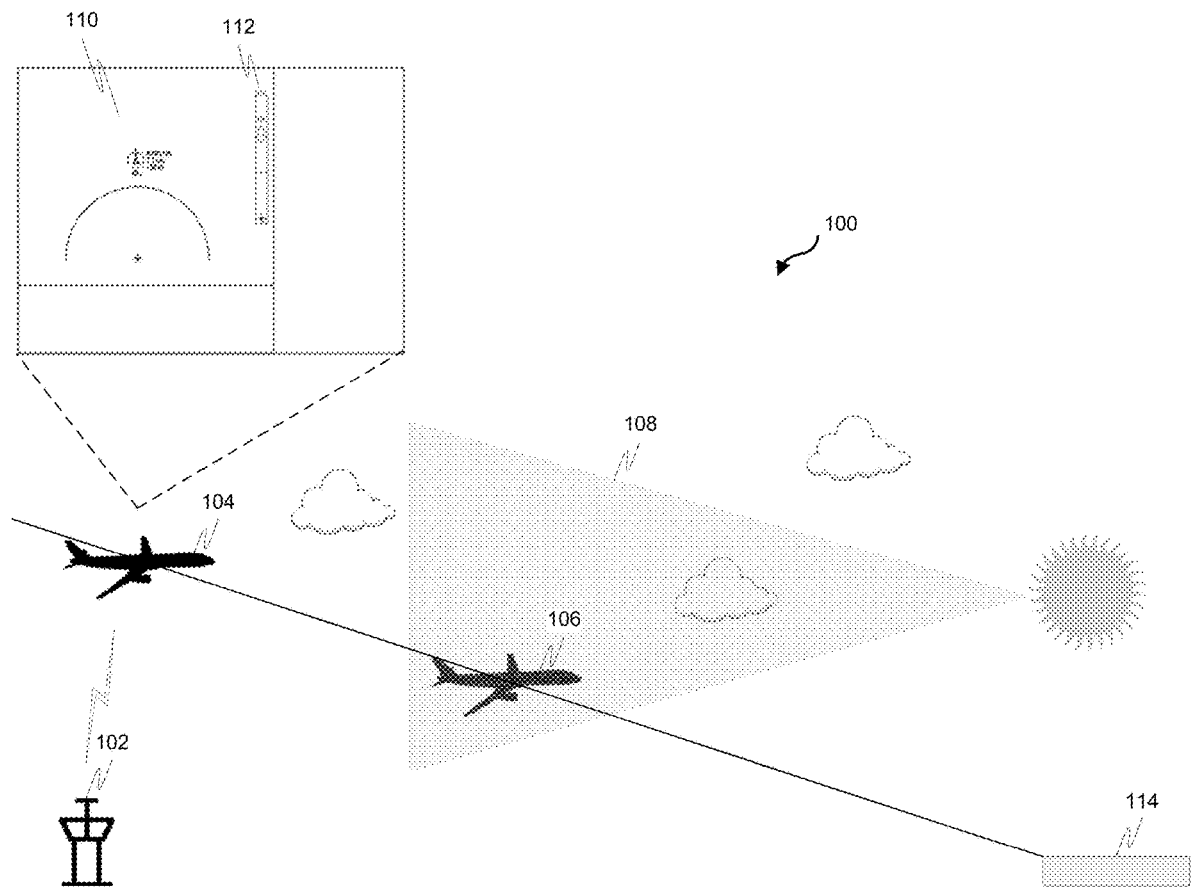
FIG. 1 is a diagram depicting an example operating environment in which a visualization assistance GUI element may be utilized, in accordance with some embodiments.

FIG. 1 is a diagram depicting an example operating environment 100 in which a visualization assistance GUI element may be utilized. In poor visibility situations it may be difficult for flight crew to maintain a desired visual separation from a target aircraft. To support flight crew situation and traffic awareness, the apparatus, systems, techniques and articles described herein provide a graphical user interface (GUI) element (e.g., a widget compliant with ARINC 661) that can help the pilot maintain own separation.

In the example environment 100, air traffic control (ATC) 102 provides clearance information to the flight crew on an ownship 104 indicating the identification designation for a target aircraft 106 to follow, for example, during a landing procedure. The flight crew of the ownship may report "Traffic in sight" to ATC 102, designate the target aircraft 106 in its aircraft equipment, and select an alerting distance threshold (i.e., a pre-selected distance) as a minimum separation distance between the ownship 104 and the target aircraft 106 the flight crew would like to maintain. The flight crew of the ownship 104 may adjust the ownship aircraft speed based on an out the window view of the target aircraft 106 to maintain a desired ownship separation from the target aircraft 106. If visual contact with the target aircraft 106 is lost (e.g., due to haze 108), the flight crew may adjust the aircraft speed of the ownship 104 based on information provided by CDTI 110 and/or the visualization assistance GUI element 112 to maintain ownship separation.

Use of the visualization assistance GUI element 112 can improve flight crew situational awareness. Use of the CDTI 110 and/or the visualization assistance GUI element 112 may end when the target aircraft 106 lands, e.g., at runway 114.

Figure 2:
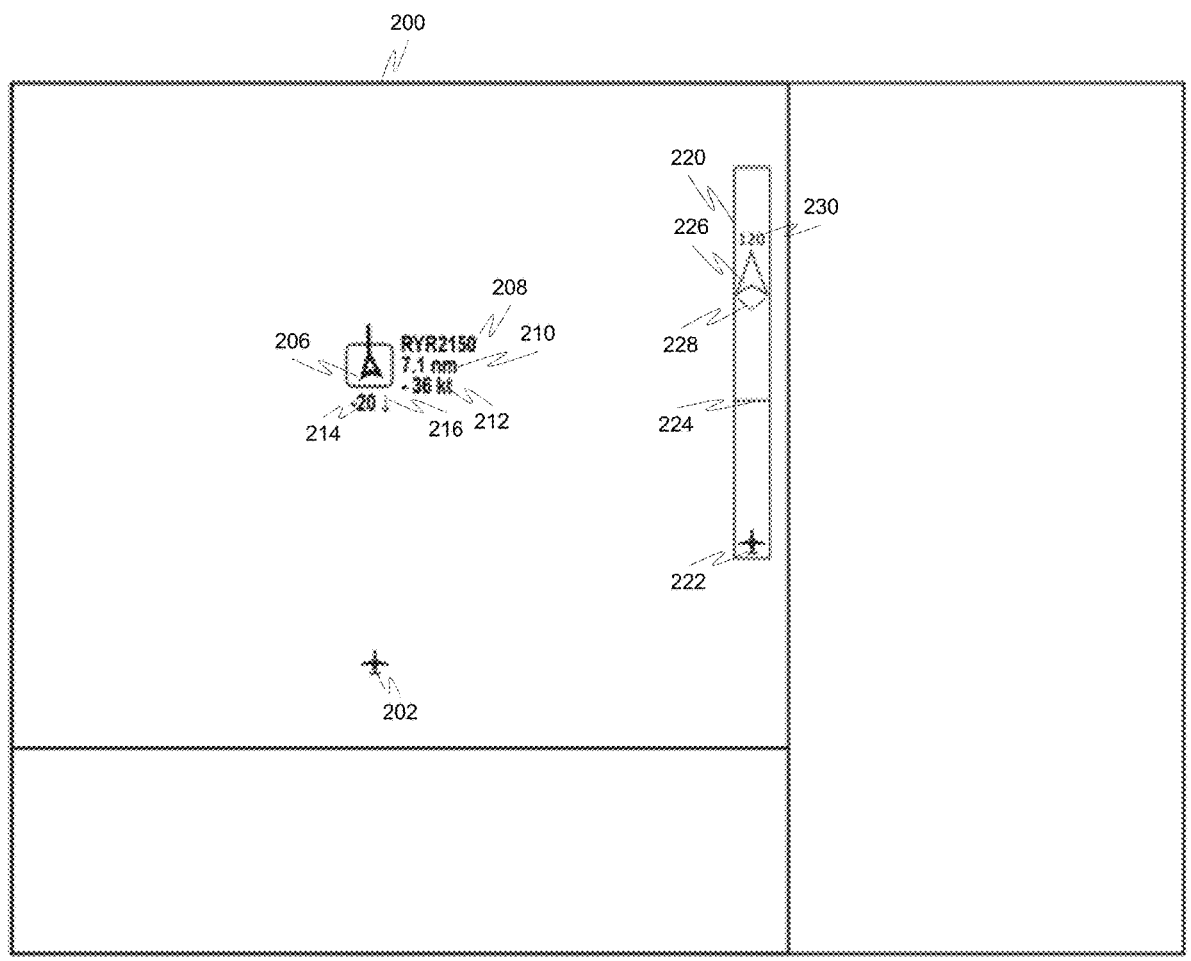
FIG. 2 is a diagram depicting an example cockpit display on which an example visualization assistance GUI element may be deployed, in accordance with some embodiments.

FIG. 2 is a diagram depicting an example cockpit display 200 on which an example visualization assistance GUI element may be deployed. The example cockpit display 200 provides a display of CDTI and a visualization assistance GUI element 220. The display of CDTI includes an ownship symbol 202, a target aircraft symbol 206, a target aircraft ID field 208, an alphanumeric horizontal range field 210, an alphanumeric differential ground speed field 212, an alphanumeric relative altitude field 214, and a vertical tendency symbol 216.

The alphanumeric horizontal range field 210 and the alphanumeric differential ground speed field 212 may alert the flight crew as to the separation distance between the ownship and the target aircraft and how fast the distance between ownship and traffic decreases. Interpreting alphanumerical information, however, is generally slower and more cognitively demanding than interpreting graphical information, especially in a busy approach phase of flight such as when the CDTI would be used. Moreover, the perceived graphical distance on the cockpit display 200 between the ownship and the target aircraft based on the ownship symbol 202 and the target aircraft symbol 206 can be misinterpreted because the map range is adjustable and may change. Additionally, the flight crew mental model of perceiving distance is based on a time and the CDTI does not provide a time-based view of distance.

The GUI element 220, in this example, is a CAVS widget that displays symbols that represent the status, in terms of separation, of the ownship and the target aircraft. The example GUI element 220 displays an ownship symbol 222, a pre-selected horizontal range symbol 224, a target aircraft symbol 226, a direction symbol 228, and a time symbol 230. The ownship symbol 222 represents the ownship aircraft.

The pre-selected horizontal range symbol 224 represents a pre-selected (e.g., by the flight crew during CAVS setup) horizontal distance ahead of an ownship aircraft that has been selected as a minimum acceptable separation distance (e.g., 2 nm) between the target aircraft and the ownship aircraft. The distance between the pre-selected horizontal range symbol 224 and the ownship symbol 222 is proportional to the pre-selected horizontal distance in accordance with a scaling factor.

The target aircraft symbol 226 represents a target aircraft that the ownship is following. The distance between the target aircraft symbol 226 and the ownship symbol 222 is proportional to the actual distance between the target aircraft and the ownship in accordance with the same scaling factor used for the proportional distance between the pre-selected horizontal range symbol 224 and the ownship symbol 222. The position of the target aircraft symbol 226 on the GUI element 220 is adjustable. As the ownship moves closer to the target aircraft, the target aircraft symbol 226 moves closer to the pre-selected horizontal range symbol 224 and the ownship symbol 222. This allows the flight crew to visually see how close the target aircraft is moving to the pre-selected separation distance without performing mental calculations.

The direction symbol 228 is configured to indicate whether a horizontal distance between the ownship aircraft and target aircraft is increasing or decreasing. In this example, a chevron is provided as the direction symbol 228. When the chevron points toward the ownship symbol, it indicates that the distance is decreasing. When the chevron points toward the target aircraft symbol, it indicates that the distance is increasing.

The time symbol 230 is configured to indicate, when the difference between the ownship and target aircraft decreases, the estimated time that it would take for the target aircraft to reach the pre-selected horizontal distance ahead of the ownship if the differential speed between the ownship and target aircraft is maintained. The time symbol 230 may be configured to be displayed when the distance is decreasing (e.g., differential ground speed is increasing) and to not be displayed when the distance is increasing (e.g., differential ground speed is decreasing).

Use of the GUI element 220 with its symbols, the ownship symbol 222, the pre-selected horizontal range symbol 224, the target aircraft symbol 226, the direction symbol 228, and the time symbol 230, can improve flight crew situational awareness and decrease flight crew workload. The movement of the target aircraft symbol 226 toward and away from the horizontal range symbol on the GUI element 220 can provide flight crew with an easier to mentally process way to maintain spacing. The value of the time symbol can provide the flight crew with the type of distance measurement that the flight crew is accustomed to using. The direction symbol 228 can provide flight crew with an easier to mentally process way of determining how quickly to increase or decrease ownship flight speed.

Figures 3A, 3B:
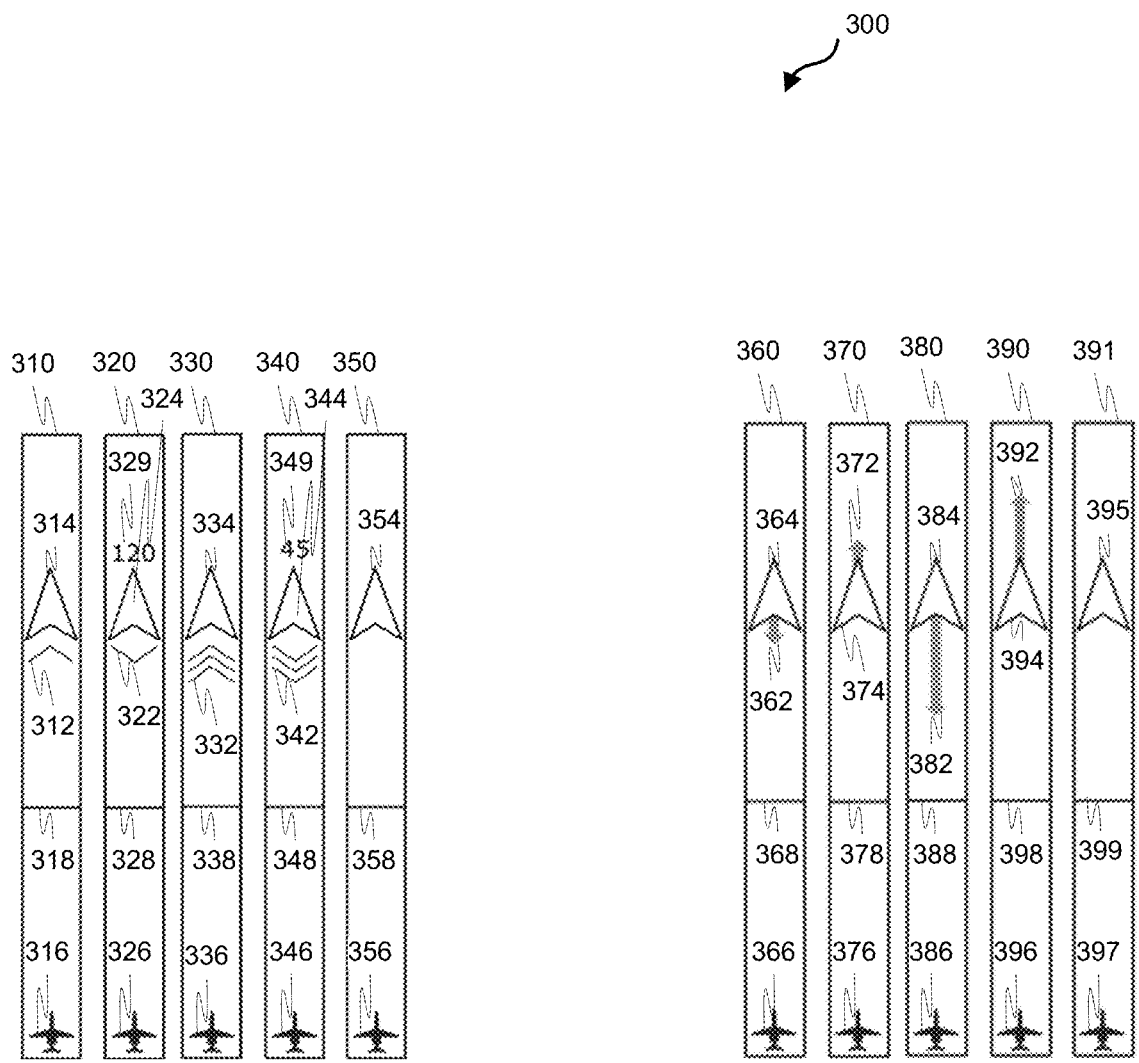
FIGS. 3A and 3B depict example states of example visualization assistance GUI elements, in accordance with some embodiments.

FIGS. 3A and 3B depict example states of example visualization assistance GUI elements. In the examples of FIG. 3A, the example visualization assistance GUI elements use one or more chevrons as a direction symbol to graphically indicate whether the horizontal separation between the target aircraft and ownship is increasing or decreasing and use a variable number of chevrons to provide a visualization of the differential ground speed. In the examples, of FIG. 3B, the example visualization assistance GUI elements use an arrow as a direction symbol to graphically indicate whether the horizontal separation between the target aircraft and ownship is increasing or decreasing and use the length of the arrow to provide a visualization of the differential ground speed.

In the example visualization assistance GUI element 310, one chevron 312 is provided. In this example, the chevron 312 points in a direction toward the target symbol 314 and away from the ownship symbol 316 and the horizontal distance symbol 318 graphically indicating that the distance between the target aircraft and the ownship (and pre-selected horizontal distance ahead of the ownship) is slowly increasing and the differential ground speed between the target aircraft and ownship is low but negative.

In the example visualization assistance GUI element 320, one chevron 322 is provided. In this example, the chevron 322 points in a direction away from the target symbol 324 and toward the ownship symbol 326 and the horizontal distance symbol 328 graphically indicating that the distance between the target aircraft and the ownship (and pre-selected horizontal distance ahead of the ownship) is slowly decreasing and the differential ground speed is low but positive. A time symbol 329, numerically indicating the time that it would take for the target aircraft to reach the pre-selected horizontal distance if the horizontal differential speed between the target aircraft and ownship horizontal speed is maintained, is provided in this example because the horizontal distance between the target aircraft and ownship is decreasing.

In the example visualization assistance GUI element 330, three chevrons 332 are provided. In this example, the chevrons 332 point in a direction toward the target symbol 334 and away from the ownship symbol 336 and the horizontal distance symbol 338 graphically indicating that the horizontal distance between the target aircraft and the ownship (and pre-selected horizontal distance ahead of the ownship) is rapidly increasing and the differential ground speed is negative and high. The provision of three chevrons visually and graphically indicate that the horizontal distance between the target aircraft and the ownship (and pre-selected horizontal distance ahead of the ownship) is rapidly increasing and the differential ground speed between the target aircraft and ownship is negative and high.

In the example visualization assistance GUI element 340, three chevrons 342 are provided. In this example, the chevrons 342 points in a direction away from the target symbol 344 and toward the ownship symbol 346 and the horizontal distance symbol 348 graphically indicating that the distance between the target aircraft and the ownship (and pre-selected horizontal distance ahead of the ownship) is rapidly decreasing and the differential ground speed is positive and high. The provision of three chevrons graphically indicate that the horizontal distance between the target aircraft and the ownship (and pre-selected horizontal distance ahead of the ownship) is rapidly decreasing and the differential ground speed is positive and high. A time symbol 349, numerically indicating the time that it would take for the target aircraft to reach the pre-selected horizontal distance if the horizontal differential speed between the target aircraft and ownship horizontal speed is maintained, is provided in this example because the horizontal distance between the target aircraft and ownship is decreasing.

In the example visualization assistance GUI element 350, no chevrons are provided. This graphically indicates that the distance between the target aircraft and the ownship (and pre-selected horizontal distance ahead of the ownship) remains constant (or near constant) and the differential ground speed is zero (or near zero).

In the example visualization assistance GUI element 360 a short arrow 362 is provided. In this example, the short arrow 362 points in a direction away from the target symbol 364 and toward the ownship symbol 366 and the horizontal distance symbol 368 graphically indicating that the distance between the target aircraft and the ownship (and pre-selected horizontal distance ahead of the ownship) is slowly decreasing and the differential ground speed is positive but low. A time symbol (not shown), numerically indicating the time that it would take for the target aircraft to reach the pre-selected horizontal distance if the horizontal differential speed between the target aircraft and ownship remained the same, could be provided in this example because the horizontal distance between the target aircraft and ownship is decreasing.

In the example visualization assistance GUI element 370 a short arrow 372 is provided. In this example, the short arrow 372 points in a direction ahead of the target symbol 374 and away from the ownship symbol 376 and the horizontal distance symbol 378 graphically indicating that the distance between the target aircraft and the ownship (and pre-selected horizontal distance ahead of the ownship) is slowly increasing and the differential ground speed is negative but low.

In the example visualization assistance GUI element 380, a long arrow 382 is provided. In this example, the long arrow 382 points in a direction away from the target symbol 384 and toward the ownship symbol 386 and the horizontal distance symbol 388 graphically indicating that the horizontal distance between the target aircraft and the ownship (and pre-selected horizontal distance ahead of the ownship) is rapidly decreasing and the differential ground speed is positive and high. The provision of a long arrow graphically indicates that the horizontal distance between the target aircraft and the ownship (and pre-selected horizontal distance ahead of the ownship) is rapidly decreasing and the differential ground speed is positive and high. A time symbol (not shown), numerically indicating the time that it would take for the target aircraft to reach the pre-selected horizontal distance if the horizontal differential speed between the target aircraft and ownship remained the same, could be provided in this example because the horizontal distance between the target aircraft and ownship is decreasing.

In the example visualization assistance GUI element 390 a long arrow 322 is provided. In this example, the long arrow 392 points in a direction ahead of the target symbol 394 and away from the ownship symbol 396 and the horizontal distance symbol 398 graphically indicating that the distance between the target aircraft and the ownship (and pre-selected horizontal distance ahead of the ownship) is rapidly increasing and the differential ground speed is negative and high. The provision of a long arrow visually and graphically indicates that the horizontal distance between the target aircraft and the ownship (and pre-selected horizontal distance ahead of the ownship) is rapidly increasing and the differential ground speed is negative and high.

In the example visualization assistance GUI element 391 no arrow is provided. This graphically indicates that the distance between the target aircraft and the ownship (and pre-selected horizontal distance ahead of the ownship) remains constant and the differential ground speed is zero or near zero.

Figure 4:
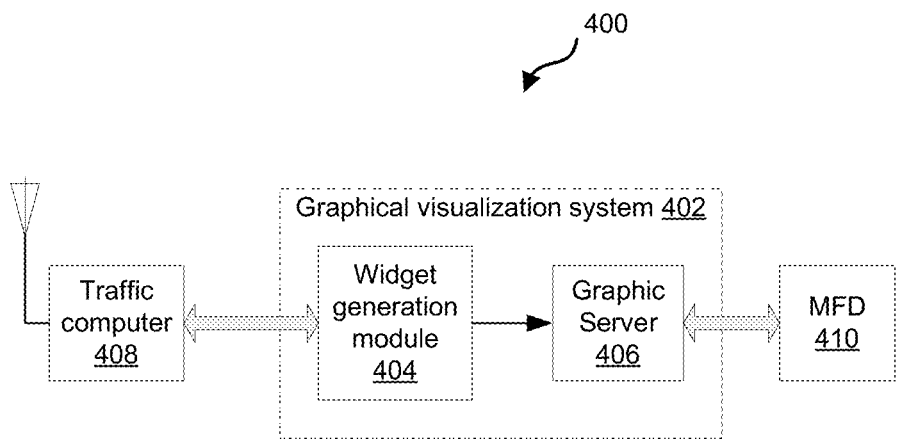
FIG. 4 is a block diagram of an example operating environment in which an example graphical visualization system for providing visual assistance to a flight crew on an aircraft during flight may be deployed, in accordance with some embodiments.

FIG. 4 is a block diagram of an example operating environment 400 in which an example graphical visualization system 402 for providing visual assistance to a flight crew on an aircraft during flight may be deployed. The example graphical visualization system 402 includes a widget generation module 404 and a graphic server 406. The widget generation module 404 is configured to exchange traffic data with a traffic computer 408 on the aircraft and using the traffic data generate a visualization widget with various symbols. The graphic server 406 is configured to render the generated widget along with graphical windows and widgets generated by other user applications (not shown) executing on the aircraft on a cockpit display device such as an MFD (multi-function display) 410.

The example widget generation module 404 comprises one or more processors configured by programming instructions on non-transient computer readable media. The example widget generation module 404 is configured to generate a graphical user interface (GUI) element that displays a plurality of symbols. The symbols may include the ownship symbol 222, the pre-selected horizontal range symbol 224, the target aircraft symbol 226, the direction symbol 228, and the time symbol 230.

The example widget generation module 404 is configured to retrieve, from a traffic computer, a distance measurement that indicates the distance between a target aircraft and the ownship, a differential ground speed measurement that indicates the differential ground speed between the target aircraft and the ownship aircraft, and a time measurement that indicates the time before the target aircraft reaches the pre-selected horizontal distance.

The example widget generation module 404 is configured to position the ownship symbol, the horizontal range symbol and the target aircraft symbol on the GUI element. The horizontal range symbol is positioned away from the ownship symbol, using a scale factor, at a distance that is proportional to the actual distance of the pre-selected horizontal range. The target aircraft symbol is positioned at a variable position that is determined based on the distance measurement retrieved from the traffic computer. The target aircraft symbol is positioned away from the horizontal range symbol and the ownship symbol at a proportional distance that uses the same scale factor as the scale factor used for the proportional distance between the horizontal range symbol and the ownship symbol. The example widget generation module 404 is further configured to adjust the position of the target aircraft symbol on the GUI element in response to distance updates from the traffic computer.

The example widget generation module 404 is configured to position and adjust the position of the direction symbol on the GUI element wherein the direction symbol is configured to indicate whether the horizontal distance between the ownship aircraft and target aircraft is increasing or decreasing. The direction toward which the direction symbol points may be adjusted based on the differential ground speed measurement, wherein the direction of the direction symbol is indicative of whether the distance between the ownship aircraft and the target aircraft is increasing or decreasing.

In some examples, the direction symbol is configured to graphically indicate the speed range (e.g., positive high/low, negative high/low, or numerical speed ranges) for the differential ground speed. In one example, the direction symbol may be in the shape of an arrow and the length of the arrow may graphically indicate the speed range for the differential ground speed. In another example, the direction symbol may be in the shape of one or more chevrons and the number of chevrons arrow may graphically indicate the speed range for the differential ground speed.

The example widget generation module 404 is further configured to generate, on the GUI element, a time symbol configured to indicate the estimated time that it would take for the target aircraft to reach the pre-selected horizontal distance ahead of an ownship aircraft. The value of the time symbol may be adjusted based on the time measurement retrieved from the traffic computer.

The example widget generation module 404 is also configured to cause the GUI element with its symbols to be displayed on a cockpit display 410. The example widget generation module 404 is configured to cause the GUI element to be displayed by forwarding the GUI element to the graphic server 406 for rendering and display on the cockpit display device 410.

Figure 5:
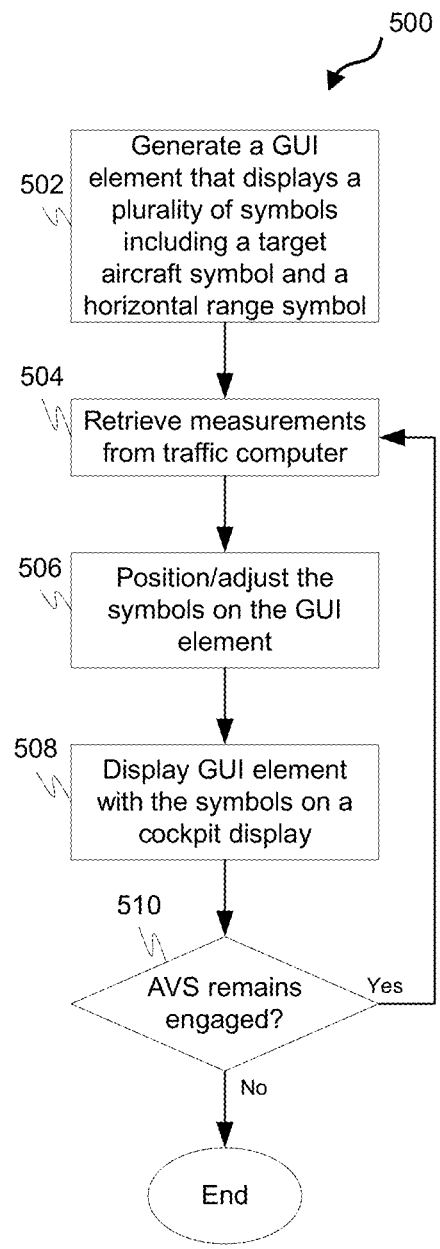
FIG. 5 is a process flow chart depicting an example process for providing visual assistance to a flight crew on an aircraft during flight, in accordance with some embodiments.

FIG. 5 is a process flow chart depicting an example process 500 for providing visual assistance to a flight crew on an aircraft during flight. The order of operation within the process is not limited to the sequential execution as illustrated in the figure, but may be performed in one or more varying orders as applicable and in accordance with the present disclosure.

The example process 500 includes generating a GUI element that displays a plurality of symbols (operation 502). The symbols may include the ownship symbol 222, the pre-selected horizontal range symbol 224, the target aircraft symbol 226, the direction symbol 228, and the time symbol 230. The target aircraft symbol represents a target aircraft, the horizontal range symbol represents a pre-selected horizontal distance ahead of an ownship aircraft, the ownship symbol represents the ownship aircraft, the direction symbol is configured to indicate whether a horizontal distance between the ownship aircraft and target aircraft is increasing or decreasing, and the time symbol is configured to indicate the estimated time that it would take for the target aircraft to reach the pre-selected horizontal distance ahead of the ownship aircraft.

The example process 500 includes retrieving measurements from a traffic computer on the ownship aircraft (operation 504). The retrieved measurements may include a distance measurement that indicates the distance between the target aircraft and the ownship aircraft, a differential ground speed measurement that indicates the differential ground speed between the target aircraft and the ownship aircraft, and a time measurement that indicates the time before the target aircraft reaches the pre-selected horizontal distance.

The example process 500 includes positioning and/or adjusting the position of the symbols on the GUI element (operation 506). The positioning and/or adjusting may include positioning the ownship symbol at a stationary position on the GUI element, positioning the horizontal range symbol at a stationary position away from the ownship symbol at a distance, using a scaling factor, that is proportional to the pre-selected horizontal distance, positioning the target aircraft symbol at a position on the GUI element away from the ownship symbol, using the same scaling factor, at a distance that is proportional to the actual horizontal distance between the ownship aircraft position and the target aircraft position, adjusting, on the GUI element, the position of the target aircraft symbol relative to the horizontal range symbol based on the distance measurement, positioning and/or adjusting the direction of the direction symbol based on the differential ground speed measurement, and positioning and/or adjusting the value of the time symbol based on the time measurement The example process 500 further includes causing the GUI element with its symbols to be displayed on a cockpit display (operation 508) and determining whether the ownship is continuing to use an assisted visual separation system (AVS) such as CAVS (decision 510). If it is determined that the AVS remains engaged (yes at decision 510), then the process 500 may loop back to retrieving measurements from the traffic computer (operation 504). If it is determined that the AVS is no longer engaged (no at decision 510), then the process 500 may end. The AVS may no longer be engaged, for example, when the target aircraft lands.

Described herein are apparatus, systems, techniques and articles for increasing the situational awareness of the flight crew when using information displayed in the cockpit such as CDTI to maintain ownship separation when visual contact is lost. Described is the provision of a GUI element, such as a widget, that can visually and graphically show the separation between a target aircraft and the ownship when visual contact is lost. The described GUI element may also graphically show the differential ground speed between the target aircraft and the ownship.

In one embodiment, a method of providing visual assistance to a flight crew on an aircraft during flight is provided. The method comprises generating a graphical user interface (GUI) element that displays a target aircraft symbol that represents a target aircraft and a horizontal range symbol that represents a pre-selected horizontal distance ahead of an ownship aircraft; positioning the target aircraft symbol at a variable position on the GUI element away from the horizontal range symbol using a fixed scaling factor, wherein the distance between the target aircraft symbol and the horizontal range symbol is proportional to an actual horizontal distance between the target aircraft position and the pre-selected horizontal distance ahead of the ownship aircraft; and causing the GUI element and the symbols to be displayed on a cockpit display.

These aspects and other embodiments may include one or more of the following features. The method may further comprise retrieving, from a traffic computer, a distance measurement that indicates the horizontal distance between the target aircraft and the ownship aircraft; and adjusting, on the GUI element, the position of the target aircraft symbol relative to the horizontal range symbol based on the distance measurement. Generating a GUI element may further comprise generating, on the GUI element, an ownship symbol that represents an ownship aircraft and a direction symbol configured to indicate whether a horizontal distance between the ownship aircraft and target aircraft is increasing or decreasing. The method may further comprise retrieving, from a traffic computer, a differential ground speed measurement that indicates the differential ground speed between the target aircraft and the ownship aircraft; and adjusting, on the GUI element, the direction of the direction symbol based on the differential ground speed measurement, wherein the direction of the direction symbol is indicative of whether the distance between the ownship aircraft and the target aircraft is increasing or decreasing. Generating a GUI element may further comprise generating, on the GUI element, a time symbol configured to indicate the estimated time that it would take for the target aircraft to reach the pre-selected horizontal distance ahead of an ownship aircraft. The method may further comprise: retrieving, from a traffic computer, a time measurement that indicates the time before the target aircraft reaches the pre-selected horizontal distance; and adjusting, on the GUI element, the value of the time symbol based on the time measurement. Generating a GUI element may further comprise generating, on the GUI element, an ownship symbol that represents an ownship aircraft, a direction symbol configured to indicate whether the distance between the ownship aircraft and target aircraft is increasing or decreasing, and a time symbol configured to indicate the estimated time that it would take for the target aircraft to reach the pre-selected horizontal distance ahead of the ownship aircraft. The method may further comprise positioning the ownship symbol, the horizontal range symbol, the target aircraft symbol, the direction symbol, and the time symbol on the GUI element wherein the positioning comprises: positioning the ownship symbol at a stationary position on the GUI element; positioning the horizontal range symbol at a stationary position away from the ownship symbol, using the fixed scaling factor, at a distance that is proportional to the pre-selected horizontal distance; and positioning the target aircraft symbol at a position on the GUI element away from the ownship symbol, using the fixed scaling factor, at a distance that is proportional to the actual horizontal distance between the ownship aircraft position and the target aircraft position. The method may further comprise: retrieving, from the traffic computer, a distance measurement that indicates the distance between the target aircraft and the ownship aircraft, a differential ground speed measurement that indicates the differential ground speed between the target aircraft and the ownship aircraft, and a time measurement that indicates the time before the target aircraft reaches the pre-selected horizontal distance; and adjusting, on the GUI element, the position of the target aircraft symbol relative to the horizontal range symbol based on the distance measurement, the direction of the direction symbol based on the differential ground speed measurement, and the value of the time symbol based on the time measurement.

In another embodiment, a graphical visualization system for providing visual assistance to a flight crew on an aircraft during flight is provided. The system comprises a widget generation module. The widget generation module comprises one or more processors configured by programming instructions on non-transient computer readable media. The widget generation module is configured to: generate a graphical user interface (GUI) element that displays a target aircraft symbol that represents a target aircraft and a horizontal range symbol that represents a pre-selected horizontal distance ahead of an ownship aircraft; position the target aircraft symbol at a variable position on the GUI element away from the horizontal range symbol using a fixed scaling factor, wherein the distance between the target aircraft symbol and the horizontal range symbol is proportional to an actual horizontal distance between the target aircraft position and the pre-selected horizontal distance ahead of the ownship aircraft; and cause the GUI element and the symbols to be displayed on a cockpit display.

These aspects and other embodiments may include one or more of the following features. The widget generation module may be further configured to: retrieve, from a traffic computer, a distance measurement that indicates a horizontal distance between the target aircraft and the ownship aircraft; and adjust, on the GUI element, the position of the target aircraft symbol relative to the horizontal range symbol based on the distance measurement. The widget generation module may be further configured to generate, on the GUI element, an ownship symbol that represents an ownship aircraft and a direction symbol configured to indicate whether a horizontal distance between the ownship aircraft and target aircraft is increasing or decreasing. The widget generation module may be further configured to: retrieve, from a traffic computer, a differential ground speed measurement that indicates the differential ground speed between the target aircraft and the ownship aircraft; and adjust, on the GUI element, the direction of the direction symbol based on the differential ground speed measurement, wherein the direction of the direction symbol is indicative of whether the distance between the ownship aircraft and the target aircraft is increasing or decreasing. The direction symbol may be configured to graphically indicate the speed range for the differential ground speed. The direction symbol may comprise an arrow and the length of the arrow may be configured to graphically indicate the speed range for the differential ground speed. The direction symbol may comprise one or more chevrons and the number of chevrons may graphically indicate the speed range for the differential ground speed. The widget generation module may be further configured to generate, on the GUI element, a time symbol configured to indicate the estimated time that it would take for the target aircraft to reach the pre-selected horizontal distance ahead of an ownship aircraft. The widget generation module may be further configured to: retrieve, from a traffic computer, a time measurement that indicates the time before the target aircraft reaches the pre-selected horizontal distance; and adjust, on the GUI element, the value of the time symbol based on the time measurement.

In another embodiment, an aircraft comprising a traffic computer, a widget generation module, and a graphic server is provided. The widget generation module comprises one or more processors configured by programming instructions on non-transient computer readable media. The widget generation module is configured to: generate a graphical user interface (GUI) element that displays a target aircraft symbol that represents a target aircraft and a horizontal range symbol that represents a pre-selected horizontal distance ahead of an ownship aircraft; and position the target aircraft symbol at a variable position on the GUI element away from the horizontal range symbol, wherein the distance between the target aircraft symbol and the horizontal range symbol is proportional to an actual horizontal distance between the target aircraft position and the pre-selected horizontal distance ahead of the ownship aircraft. The graphic server is configured to cause the GUI element and the symbols to be displayed on a cockpit display.

These aspects and other embodiments may include one or more of the following features. The widget generation module may be further configured to: generate, on the GUI element, an ownship symbol that represents an ownship aircraft, a direction symbol configured to indicate whether the distance between the ownship aircraft and target aircraft is increasing or decreasing, and a time symbol configured to indicate the estimated time that it would take for the target aircraft to reach the pre-selected horizontal distance ahead of the ownship aircraft; position the ownship symbol at a stationary position on the GUI element, position the horizontal range symbol at a stationary position away from the ownship symbol at a distance that is proportional to the pre-selected horizontal distance, and position the target aircraft symbol at a position on the GUI element away from the ownship symbol at a distance that is proportional to the actual horizontal distance between the ownship aircraft position and the target aircraft position; retrieve, from the traffic computer, a distance measurement that indicates the horizontal distance between the target aircraft and the ownship aircraft, a differential ground speed measurement that indicates the differential ground speed between the target aircraft and the ownship aircraft and a time measurement that indicates the time before the target aircraft reaches the pre-selected horizontal distance; and adjust, on the GUI element, the position of the target aircraft symbol relative to the horizontal range symbol based on the distance measurement, the direction of the direction symbol based on the differential ground speed measurement, and the value of the time symbol based on the time measurement.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of providing visual assistance to a flight crew on an aircraft during flight, the method comprising:
    generating a graphical user interface (GUI) element that displays a target aircraft symbol that represents a target aircraft, a horizontal range symbol that represents a pre-selected horizontal distance ahead of an ownship aircraft, an ownship symbol that represents an ownship aircraft, a direction symbol configured to indicate whether the distance between the ownship aircraft and target aircraft is increasing or decreasing, and a time symbol configured to indicate the estimated time that it would take for the target aircraft to reach the pre-selected horizontal distance ahead of the ownship aircraft;
    positioning the ownship symbol, the horizontal range symbol, the target aircraft symbol, the direction symbol, and the time symbol on the GUI element, the positioning comprising:
        positioning the ownship symbol at a stationary position on the GUI element;
        positioning the horizontal range symbol at a stationary position away from the ownship symbol, using a fixed scaling factor, at a distance that is proportional to the pre-selected horizontal distance; and
        positioning the target aircraft symbol at a position on the GUI element away from the ownship symbol, using the fixed scaling factor, at a distance that is proportional to the actual horizontal distance between the ownship aircraft position and the target aircraft position;
    retrieving, from a traffic computer, a distance measurement that indicates the distance between the target aircraft and the ownship aircraft, a differential ground speed measurement that indicates the differential ground speed between the target aircraft and the ownship aircraft, and a time measurement that indicates the time before the target aircraft reaches the pre-selected horizontal distance;
    adjusting, on the GUI element, the position of the target aircraft symbol relative to the horizontal range symbol based on the distance measurement, the direction of the direction symbol based on the differential ground speed measurement, and the value of the time symbol based on the time measurement; and
    causing the GUI element and the symbols to be displayed on a cockpit display.

2. The method of claim 1, wherein the direction symbol is configured to indicate whether a horizontal distance between the ownship aircraft and target aircraft is increasing or decreasing.

3. The method of claim 2,
    wherein the direction of the direction symbol is indicative of whether the distance between the ownship aircraft and the target aircraft is increasing or decreasing.

4. The method of claim 1, wherein the direction symbol is configured to graphically indicate the speed range for the differential ground speed.

5. The method of claim 4, wherein the direction symbol comprises an arrow and the length of the arrow is configured to graphically indicate the speed range for the differential ground speed.

6. The method of claim 4, wherein the direction symbol comprises one or more chevrons and the number of chevrons graphically indicates the speed range for the differential ground speed.

7. A graphical visualization system for providing visual assistance to a flight crew on an aircraft during flight, the system comprising a widget generation module, the widget generation module comprising one or more processors configured by programming instructions on non-transient computer readable media, the widget generation module configured to:
    generate a graphical user interface (GUI) element that displays a target aircraft symbol that represents a target aircraft, a horizontal range symbol that represents a pre-selected horizontal distance ahead of an ownship aircraft, an ownship symbol that represents an ownship aircraft, a direction symbol configured to indicate whether the distance between the ownship aircraft and target aircraft is increasing or decreasing, and a time symbol configured to indicate the estimated time that it would take for the target aircraft to reach the pre-selected horizontal distance ahead of the ownship aircraft;

position the target aircraft symbol at a variable position on the GUI element away from the horizontal range symbol using a fixed scaling factor, wherein the distance between the target aircraft symbol and the horizontal range symbol is proportional to an actual horizontal distance between the target aircraft position and the pre-selected horizontal distance ahead of the ownship aircraft;

position the ownship symbol at a stationary position on the GUI element, position the horizontal range symbol at a stationary position away from the ownship symbol at a distance that is proportional to the pre-selected horizontal distance, and position the target aircraft symbol at a position on the GUI element away from the ownship symbol at a distance that is proportional to the actual horizontal distance between the ownship aircraft position and the target aircraft position;

retrieve, from the traffic computer, a distance measurement that indicates the horizontal distance between the target aircraft and the ownship aircraft, a differential ground speed measurement that indicates the differential ground speed between the target aircraft and the ownship aircraft and a time measurement that indicates the time before the target aircraft reaches the pre-selected horizontal distance;

adjust, on the GUI element, the position of the target aircraft symbol relative to the horizontal range symbol based on the distance measurement, the direction of the direction symbol based on the differential ground speed measurement, and the value of the time symbol based on the time measurement; and cause the GUI element and the symbols to be displayed on a cockpit display.

8. The system of claim 7, wherein the direction symbol is configured to indicate whether a horizontal distance between the ownship aircraft and target aircraft is increasing or decreasing.

9. The system of claim 7, wherein the direction of the direction symbol is indicative of whether the distance between the ownship aircraft and the target aircraft is increasing or decreasing.

10. The system of claim 7, wherein to adjust the direction of the direction symbol, the widget generation module is configured to remove the direction symbol from the GUI element when the distance between the target aircraft and the ownship aircraft remains constant.

11. The system of claim 7, wherein the direction symbol is configured to graphically indicate the speed range for the differential ground speed.

12. The system of claim 11, wherein the direction symbol comprises an arrow and the length of the arrow is configured to graphically indicate the speed range for the differential ground speed.

13. The system of claim 11, wherein the direction symbol comprises one or more chevrons and the number of chevrons graphically indicates the speed range for the differential ground speed.

14. An aircraft comprising:
a traffic computer;
a widget generation module, the widget generation module comprising one or more processors configured by programming instructions on non-transient computer readable media, the widget generation module configured to:
generate a graphical user interface (GUI) element that displays a target aircraft symbol that represents a target aircraft, a horizontal range symbol that represents a pre-selected horizontal distance ahead of an ownship aircraft, an ownship symbol that represents an ownship aircraft, a direction symbol configured to indicate whether the distance between the ownship aircraft and target aircraft is increasing or decreasing, and a time symbol configured to indicate the estimated time that it would take for the target aircraft to reach the pre-selected horizontal distance ahead of the ownship aircraft;

position the target aircraft symbol at a variable position on the GUI element away from the horizontal range symbol, wherein the distance between the target aircraft symbol and the horizontal range symbol is proportional to an actual horizontal distance between the target aircraft position and the pre-selected horizontal distance ahead of the ownship aircraft;

position the ownship symbol at a stationary position on the GUI element, position the horizontal range symbol at a stationary position away from the ownship symbol at a distance that is proportional to the pre-selected horizontal distance, and position the target aircraft symbol at a position on the GUI element away from the ownship symbol at a distance that is proportional to the actual horizontal distance between the ownship aircraft position and the target aircraft position;

retrieve, from the traffic computer, a distance measurement that indicates the horizontal distance between the target aircraft and the ownship aircraft, a differential ground speed measurement that indicates the differential ground speed between the target aircraft and the ownship aircraft and a time measurement that indicates the time before the target aircraft reaches the pre-selected horizontal distance;

adjust, on the GUI element, the position of the target aircraft symbol relative to the horizontal range symbol based on the distance measurement, the direction of the direction symbol based on the differential ground speed measurement, and the value of the time symbol based on the time measurement; and a graphic server configured to cause the GUI element and the symbols to be displayed on a cockpit display.

15. The aircraft of claim 14, wherein the direction symbol is configured to graphically indicate the speed range for the differential ground speed.

16. The aircraft of claim 15, wherein the direction symbol comprises an arrow and the length of the arrow is configured to graphically indicate the speed range for the differential ground speed.

17. The aircraft of claim 15, wherein the direction symbol comprises one or more chevrons and the number of chevrons graphically indicates the speed range for the differential ground speed.

18. The aircraft of claim 14, wherein the direction symbol is configured to indicate whether a horizontal distance between the ownship aircraft and target aircraft is increasing or decreasing.

19. The aircraft of claim 14, wherein the direction of the direction symbol is indicative of whether the distance between the ownship aircraft and the target aircraft is increasing or decreasing.

20. The aircraft of claim 14, wherein to adjust the direction of the direction symbol, the widget generation module is configured to remove the direction symbol from the GUI element when the distance between the target aircraft and the ownship aircraft remains constant.

\* \* \* \* \*